(12) United States Patent
Matsuura

(10) Patent No.: US 12,547,857 B2
(45) Date of Patent: Feb. 10, 2026

(54) INFORMATION PROCESSING APPARATUS, READING SYSTEM, INFORMATION PROCESSING METHOD, AND NON-TRANSITORY COMPUTER READABLE MEDIUM STORING PROGRAM

(71) Applicant: NEC Platforms, Ltd., Kawasaki (JP)

(72) Inventor: Hideki Matsuura, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 19 days.

(21) Appl. No.: 18/036,826

(22) PCT Filed: Aug. 31, 2021

(86) PCT No.: PCT/JP2021/031835
§ 371 (c)(1),
(2) Date: May 12, 2023

(87) PCT Pub. No.: WO2022/107413
PCT Pub. Date: May 27, 2022

(65) Prior Publication Data
US 2023/0409850 A1    Dec. 21, 2023

(30) Foreign Application Priority Data
Nov. 17, 2020  (JP) .................................. 2020-191088

(51) Int. Cl.
*G06K 7/10*   (2006.01)
(52) U.S. Cl.
CPC ..... *G06K 7/10425* (2013.01); *G06K 7/10108* (2013.01)

(58) Field of Classification Search
CPC .. G06K 7/10425; G06K 7/10108; G06K 7/10; B65G 1/137
See application file for complete search history.

(56) References Cited

U.S. PATENT DOCUMENTS

| 6,796,799 B1 | 9/2004 | Yoshiike et al. |
| 2013/0169417 A1 | 7/2013 | Sugano et al. |

(Continued)

FOREIGN PATENT DOCUMENTS

| JP | H04-369790 A | 12/1992 |
| JP | H05-012522 A | 1/1993 |

(Continued)

OTHER PUBLICATIONS

JP Office Action for JP Application No. 2022-103332, mailed on Aug. 8, 2023 with English Translation.

(Continued)

*Primary Examiner* — James J Yang

(57) ABSTRACT

An information processing apparatus, a reading system, an information processing method, and a program capable of manage carrying-in or carrying-out of articles more reliably are provided.
An information processing apparatus (1) includes a flow line specification unit (2) that specifies a flow line of a movement of an object in a predetermined area near a gate, an RSSI acquisition unit (3) that acquires an RSSI of a signal transmitted from an RFID tag located near the gate, and a passage determination unit (4) that determines whether or not an article specified by identification information read from the RFID tag has passed through the gate based on the specified flow line and the acquired RSSI.

4 Claims, 20 Drawing Sheets

(56) References Cited

U.S. PATENT DOCUMENTS

2019/0303631 A1\* 10/2019 Ogawa ............... G06K 7/10108
2021/0150505 A1\* 5/2021 Kumagawa ............ G06Q 30/06

FOREIGN PATENT DOCUMENTS

| | | | |
|---|---|---|---|
| JP | H10-049718 | A | 2/1998 |
| JP | 2001-074855 | A | 3/2001 |
| JP | 2002-131450 | A | 5/2002 |
| JP | 2002-334361 | A | 11/2002 |
| JP | 2005-284670 | A | 10/2005 |
| JP | 2008-024510 | A | 2/2008 |
| JP | 2009-110088 | A | 5/2009 |
| JP | 2009276939 | A \* | 11/2009 |
| JP | 2010-218280 | A | 9/2010 |
| JP | 2011-001132 | A | 1/2011 |
| JP | 2011-210216 | A | 10/2011 |
| JP | 2012-133802 | A | 7/2012 |
| JP | 2012-194720 | A | 10/2012 |
| JP | 2013-037663 | A | 2/2013 |
| JP | 2013-140434 | A | 7/2013 |
| JP | 2013-191051 | A | 9/2013 |
| JP | 2015-203912 | A | 11/2015 |
| JP | 2016-076092 | A | 5/2016 |
| JP | 2017-058828 | A | 3/2017 |
| JP | 2017-116389 | A | 6/2017 |
| JP | 2017-162357 | A | 9/2017 |
| JP | 2019-113906 | A | 7/2019 |
| JP | 2020-154373 | A | 9/2020 |
| JP | 6835420 | B2 | 2/2021 |
| JP | 7160192 | B2 | 10/2022 |
| JP | 7306730 | B2 | 7/2023 |
| WO | 2017/187603 | A1 | 11/2017 |
| WO | 2018/030337 | A1 | 2/2018 |
| WO | 2021/186789 | A1 | 9/2021 |

OTHER PUBLICATIONS

Niwakawa et al, "Observation of the Back Gate with Camera Images Using Optical Flows and Time Correlation of Local Windows in the Images", IEEJ Transactions on Electronics, Information and Systems, vol. 123, Issue 7, the Institute of Electrical Engineers of Japan, pp. 1292-pp. 1297, Jul. 1, 2003.
JP Office Action for JP Application No. 2023-138746, mailed on May 7, 2024 with English Translation.
International Search Report for PCT Application No. PCT/JP2021/031835, mailed on Nov. 16, 2021.
JP Office Action (Decision to Grant a Patent) for JP Application No. 2020-191088, mailed on May 31, 2022 with English Translation.
JP Office Action for JP Application No. 2024-148387, mailed on Aug. 5, 2025 with English Translation.
JP Office Action for JP Application No. 2024-148387, mailed on Aug. 25, 2025 with English Translation.

\* cited by examiner

INFORMATION PROCESSING APPARATUS, READING SYSTEM, INFORMATION PROCESSING METHOD, AND NON-TRANSITORY COMPUTER READABLE MEDIUM STORING PROGRAM

This application is a National Stage Entry of PCT/JP2021/031835 filed on Aug. 31, 2021, which claims priority from Japanese Patent Application 2020-191088 filed on Nov. 17, 2020, the contents of all of which are incorporated herein by reference, in their entirety.

TECHNICAL FIELD

The present invention relates to an information processing apparatus, a reading system, an information processing method, and a program.

BACKGROUND ART

In recent years, various technologies using a radio frequency identifier (RFID) have been proposed. For example, Patent Literature 1 discloses a system that manages (i.e., determine) whether or not articles have passed through a gate by using RFID tags. In the technology disclosed in this literature, it is determined whether an article with an RFID tag attached thereto has passed through a gate by using an RSSI (Received Signal Strength Indicator) of a signal transmitted from the tag.

CITATION LIST

Patent Literature

Patent Literature 1: Japanese Unexamined Patent Application Publication No. 2011-1132

SUMMARY OF INVENTION

Technical Problem

However, in general, although it is possible to check whether a tag is approaching a gate or moving away from the gate based on the magnitude of an RSSI, it is impossible to definitely determine whether or not the tag has actually passed through the gate. That is, there is a possibility that a tag (an article) that has not actually passed through the gate may be incorrectly determined to have passed through the gate.

Therefore, there has been a demand for a technology for, when it is managed (i.e., determined) whether or not an article has been carried in or carried out by reading an RFID tag attached to the article at a gate (a carry-in entrance or a carrying-out exit), more reliably determining whether the article has actually passed through the gate by using the tag.

Therefore, an object that an example embodiment disclosed herein seeks to achieve is to provide an information processing apparatus, a reading system, an information processing method, and a program capable of managing carrying-in or carrying-out of articles more reliably.

Solution to Problem

An information processing apparatus according to a first example aspect includes:

flow line specification means for specifying a flow line of a movement of an object in a predetermined area near a gate;
RSSI acquisition means for acquiring an RSSI of a signal transmitted from an RFID tag located near the gate; and
passage determination means for determining whether or not an article specified by identification information read from the RFID tag has passed through the gate based on the specified flow line and the acquired RSSI.

A reading system according to a second example aspect includes:

a sensor configured to detect an object;
a reading apparatus configured to communicate with an RFID tag and thereby read information stored in the RFID tag, and to measure an RSSI of a signal transmitted from the RFID tag; and
an information processing apparatus, in which
the information processing apparatus includes:
flow line specification means for specifying a flow line of a movement of an object in a predetermined area near a gate based on a result of the detection of the sensor;
RSSI acquisition means for acquiring an RSSI of a signal transmitted from an RFID tag located near the gate from the reading apparatus; and
passage determination means for determining whether or not an article specified by identification information read from the RFID tag by the reading apparatus has passed through the gate based on the specified flow line and the acquired RSSI.

An information processing method according to a third example aspect includes:

specifying a flow line of a movement of an object in a predetermined area near a gate;
acquiring an RSSI of a signal transmitted from an RFID tag located near the gate; and
determining whether or not an article specified by identification information read from the RFID tag has passed through the gate based on the specified flow line and the acquired RSSI.

A program according to a fourth example aspect causes a computer to perform:

a flow line specification step of specifying a flow line of a movement of an object in a predetermined area near a gate;
a RSSI acquisition step of acquiring an RSSI of a signal transmitted from an RFID tag located near the gate; and
a passage determination step of determining whether or not an article specified by identification information read from the RFID tag has passed through the gate based on the specified flow line and the acquired RSSI.

Advantageous Effects of Invention

According to the above-described aspect, it is possible to provide an information processing apparatus, a reading system, an information processing method, and a program capable of manage carrying-in or carrying-out of articles more reliably.

EXAMPLE EMBODIMENT

<Outline of Example Embodiment>

Figure 1:
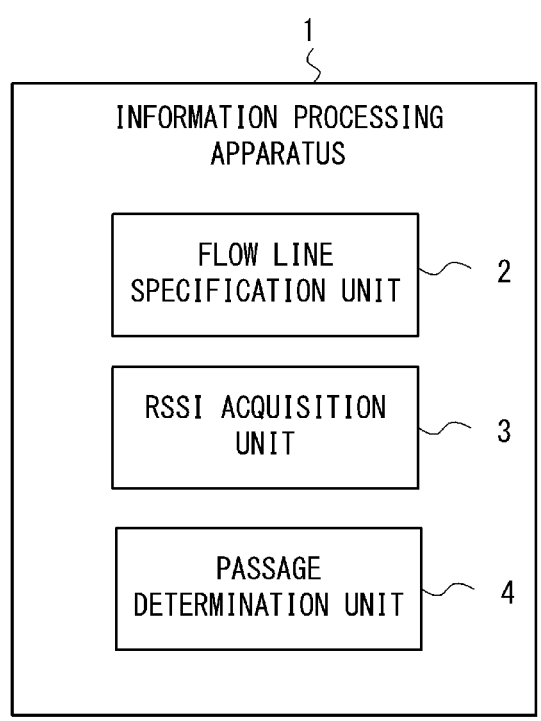
FIG. 1 is a block diagram showing an example of a configuration of an information processing apparatus according to an outline of an example embodiment.

Prior to describing an example embodiment in detail, an outline of the example embodiment will be given. FIG. 1 is a block diagram showing an example of a configuration of an information processing apparatus 1 according to the outline of the example embodiment. As shown in FIG. 1, the information processing apparatus 1 includes a flow line specification unit 2, an RSSI acquisition unit 3, and a passage determination unit 4.

The flow line specification unit 2 specifies a flow line of the movement (i.e., a moving path) of an object in a predetermined area near a gate.

The RSSI acquisition unit 3 acquires an RSSI of a signal transmitted from an RFID tag located near the gate.

The passage determination unit 4 determines, based on the flow line specified by the flow line specification unit 2 and the RSSI acquired by the RSSI acquisition unit 3, whether or not an article specified by identification information read from the RFID tag has actually passed through the gate.

In the case where such a determination is made based solely on the flow line, the reading processing is performed for not only an RFID tag that has actually passed through the gate but also an RFID tag that is merely located near the gate, so that there is a possibility that a tag that has not actually passed through the gate may be incorrectly determined to have passed through the gate. Further, in the case where such a determination is made based solely on the RSSI, it is impossible to distinguish between an RFID tag that has approached the gate, passed through the gate, and then moved away from the gate, and an RFID tag that has approached the gate and then moved away from the gate without actually passing through the gate. Therefore, even in this case, the tag that has not actually passed through the gate may be incorrectly determined to have passed through the gate. In contrast to this, according to the information processing apparatus 1, the determination of whether an article has passed through the gate is made by using two types of information items, i.e., the RSSI of a signal transmitted from the RFID tag and the flow line of a movement that has occurred in an area near the gate. Therefore, the above-described incorrect determination can be prevented. Consequently, it is possible to manage (i.e., determine) the carrying-in or carrying-out of articles more reliably.

Note that, in the present disclosure, a gate is a partition of a space set for managing the carrying-in or the carrying-out of an article, and may not necessarily be a physical structure. The gate may be referred to as a conveyance entrance, or a carry-in entrance or a carry-out entrance. For example, in a case in which the carrying-in of an article into a certain place is managed, when the article is moved from the entrance side of a gate (a carry-in entrance) to the exit side thereof, it means that the article has been carried in. Similarly, in a case in which the carrying-out of an article from a certain place is managed, when the article is moved from the entrance side of a gate (a carry-out entrance) to the exit side thereof, it means that the article has been carried out. Note that, specifically, the carrying-in or the carrying-out of an article may be, for example, a carrying-in or a carrying-out of an article in a warehouse or a store (putting an article into or taking an article out of a storage). Further, when a gate is installed in a store that sells merchandise, management of the passage of the merchandise through the gate (i.e., management of the carrying-out of the merchandise) means specification of the merchandise to be purchased. As described above, the information processing apparatus 1 can be used to manage the carrying-in or the carrying-out of an article in various types of environments.

FIRST EXAMPLE EMBODIMENT

Next, details of the example embodiment will be described.

Figure 2:
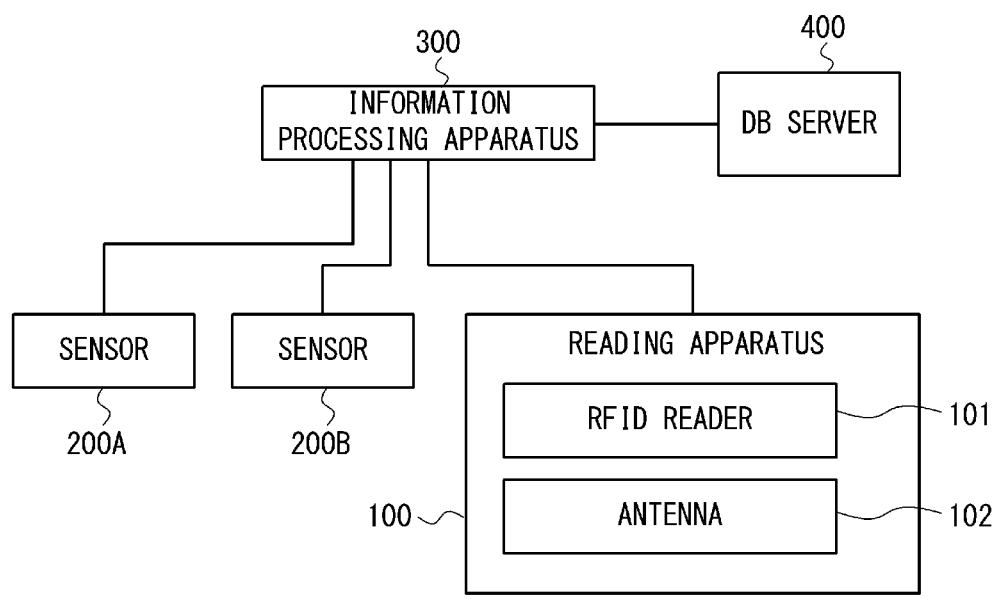
FIG. 2 is a block diagram showing an example of a configuration of a reading system according to a first example embodiment.
Figure 3:
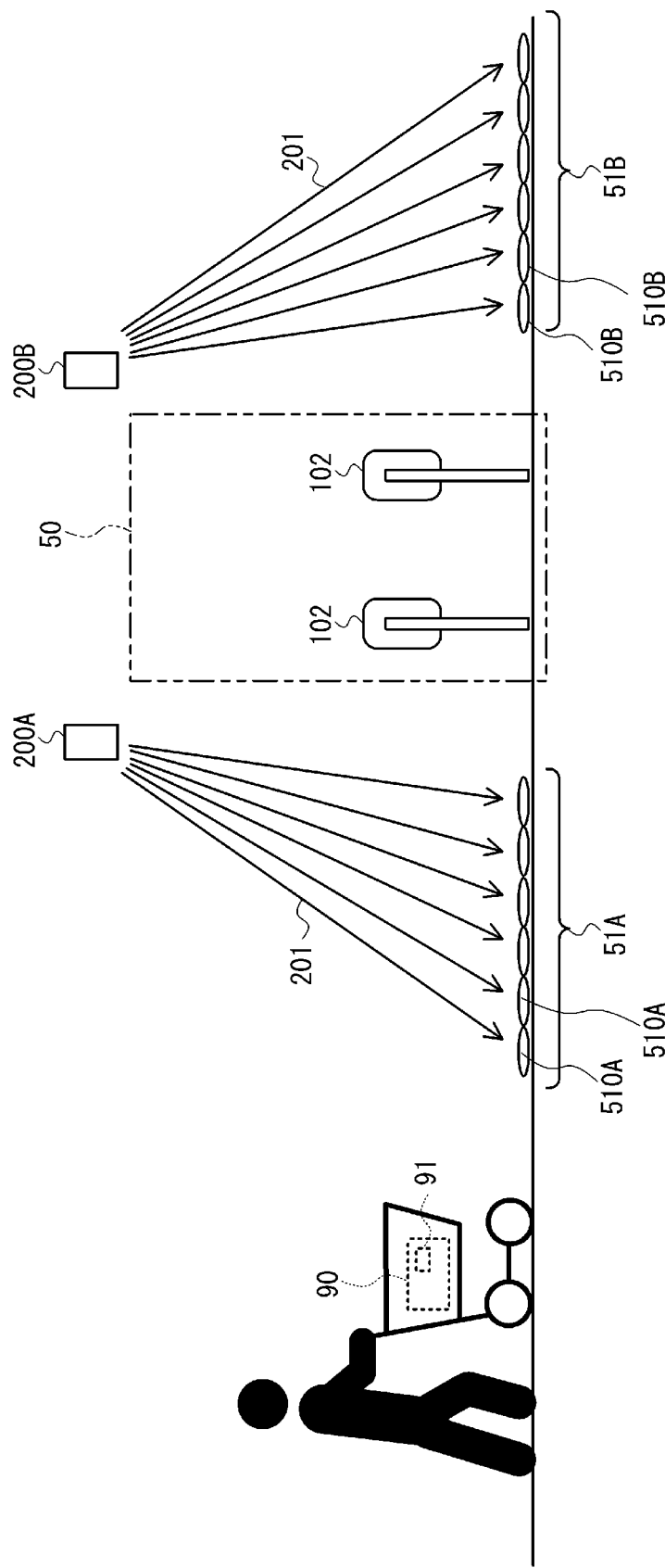
FIG. 3 is a schematic diagram showing the periphery of a gate viewed from the side thereof.
Figure 4:
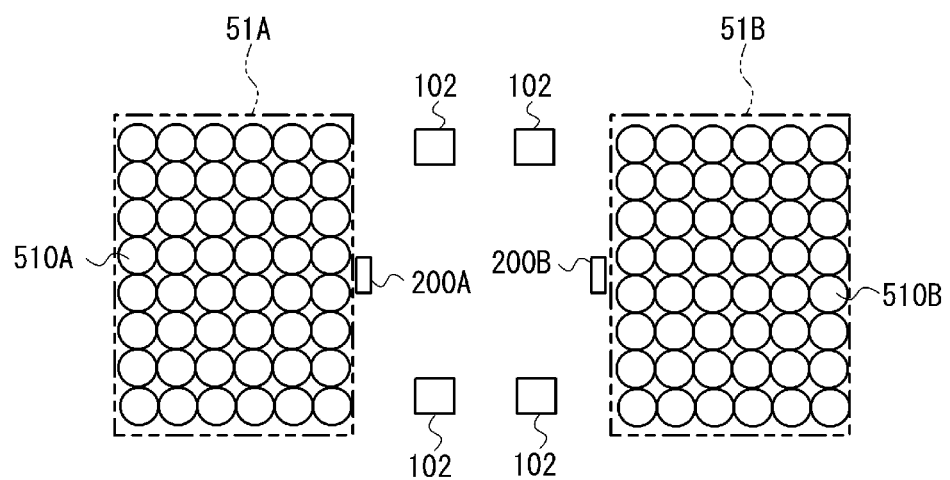
FIG. 4 is a schematic diagram showing a detection area of the sensor and showing the gate viewed from above.

FIG. 2 is a block diagram showing an example of a configuration of a reading system 10 according to a first example embodiment. Further, FIG. 3 is a schematic diagram showing the periphery of a gate 50 viewed from the side thereof. Further, FIG. 4 is a schematic diagram showing a detection area of each of a sensor 200A and a sensor 200B and showing the gate viewed from above. As shown in FIG. 2, the reading system 10 includes a reading apparatus 100, the sensors 200A and 200B, an information processing apparatus 300, and a DB server 400. The reading system 10 is a system that manages the conveyance (specifically, the carrying-in or the carrying-out) of an article 90 by managing the passage of the article 90 through the gate. The reading system 10 specifies the article 90 that has passed through the gate 50 by reading an RFID tag 91 attached to the article 90 to be managed. By doing so, the reading system 10 manages each article 90 as to whether or not it has been conveyed.

Note that, in the description of this example embodiment, although an entrance and an exit are defined for the gate 50 for the sake of convenience of description, the reading system 10 may manage the conveyance of an article through the gate in both the exit and entrance directions instead of managing the conveyance of an article through the gate in one direction only.

The reading apparatus 100 is an apparatus for communicating with the RFID tag 91 and thereby reading information stored in the RFID tag 91 attached to the article 90 for which the carrying-in or the carrying-out is managed, and includes an RFID reader 101 and an antenna 102. The reading apparatus 100 is connected to the information processing apparatus 300 wirelessly or by wire so that they can communicate with each other. Note that, for example, identification information for uniquely specifying the article 90 is stored in advance in the RFID tag 91, and the reading apparatus 100 reads the information stored in the RFID tag 91.

The RFID reader 101 is a control circuit that communicates with the RFID tag 91 through the antenna 102 in accordance with a predetermined communication protocol and reads information stored in the RFID tag 91. Further, the RFID reader 101 measures an RSSI of a signal that has been transmitted from the RFID tag 91 and received through the antenna 102. The RFID reader 101 outputs the information read from the RFID tag 91 to the information processing apparatus 300. Further, the RFID reader 101 outputs time series data of the RSSI of the signal transmitted from the RFID tag 91 to the information processing apparatus 300. More specifically, the time series data of the RSSI is data in which the identification information of the RFID tag that has transmitted the signal, the value of the RSSI, and time information are associated with each other.

The antenna 102, which is installed at a position where it can transmit and receive radio waves to and from the RFID tag 91 passing through the gate, transmits radio waves to the RFID tag 91 and receives radio waves transmitted by the RFID tag 91. In this example embodiment, a total of four antennas 102, two at each side of the gate 50, are installed at the gate 50. However, the number of antennas 102 is not limited and may be one or more. Further, regarding the antennas 102, an antenna for transmission and an antenna for reception may be separately provided.

Each of the sensors 200A and 200B is a sensor that detects an object in a predetermined area. The sensors 200A and 200B are connected to the information processing apparatus 300 wirelessly or by wire so that they can communicate with each other. The sensors 200A and 200B detect various type of objects that have entered a predetermined area, such as a person, an Automated Guided Vehicle (AGV), and an article. The sensor 200A is a sensor that detects an object in a predetermined detection area 51A (also referred to as a first area) on the entrance side of the gate 50 (see FIGS. 3 and 4). Further, the sensor 200B is a sensor that detects an object in a predetermined detection area 51B (also referred to as a second area) on the exit side of the gate 50 (see FIGS. 3 and 4). In this example embodiment, the sensor 200A is provided near the upper part of the gate 50 on the entrance side thereof, and the sensor 200B is provided near the upper part of the gate 50 on the exit side thereof.

In this example embodiment, the sensors 200A and 200B are sensors that detect objects by emitting light beams 201 to respective partial areas 510A and 510B obtained by dividing the respective predetermined detection areas 51A and 51B into a lattice shape and receiving reflected lights of the light beams 201. Note that the light beam 201 is, for example, an infrared ray. However, the light beam 201 is not limited thereto. The sensors 200A and 200B detect objects by detecting whether or not the light beams 201 emitted to the respective partial areas 510A and 510B are blocked by objects. The sensor 200A emits the light beam to each of the partial areas 510A (see FIGS. 3 and 4) obtained by dividing the detection area 51A located on the entrance side of the gate 50 into a lattice shape, and receives a reflected light of each of the emitted light beams. Similarly, the sensor 200B emits the light beam to each of the partial areas 510B (see FIGS. 3 and 4) obtained by dividing the detection area 51B located on the exit side of the gate 50 into a lattice shape, and receives a reflected light of each of the emitted light beams.

The sensors 200A and 200B detect the presence of an object by the difference between a reception state of the reflected light in a case where the object is present and a reception state of the reflected light in a case where the object is not present. This difference between the reception states of the reflected lights may be a difference between the lengths of time for which lights are reflected or a difference between the amounts of lights received.

As described above, the sensors 200A and 200B emit light beams to the respective partial areas 510A and 510B. Therefore, when the total number of the partial areas 510A or 510B in the corresponding detection area 51A or 51B is n, the sensors 200A and 200B obtain n detection results as a result of the detection of the object. When the object moves within the detection area 51A or 51B, the range of the partial area 510A or 510B from which the detection result indicating that the object is present is obtained changes with time. Further, the transition of the range of the partial area 510A or 510B from which the detection result indicating that the object is present is obtained corresponds to the moving direction of the object. Therefore, by analyzing the time series data of the n detection results of the sensors 200A and 200B, it is possible to specify the moving direction of the object in the detection area 51A or 51B. That is, it is possible to specify the flow line. Further, since the detection results of the sensors 200A and 200B include the time information, the period during which the flow line has been generated (the period during which the object has moved) can also be specified. In this example embodiment, the flow line is specified by the information processing apparatus 300. Therefore, each of the sensors 200A and 200B continuously transmits the above-described n detection results to the information processing apparatus 300. In this way, the information processing apparatus 300 acquires the time series data of the detection results of the respective partial areas 510A and 510B by the respective sensors 200A and 200B.

Note that, in this example embodiment, although the sensor 200A for the entrance and the sensor 200B for the exit are used for detecting an object in each of the respective detection areas 51A and 51B, only one sensor for detecting an object in both of the detection areas 51A and 51B may instead be used.

Further, as described above, in this example embodiment, although sensors that emit the light beams 201 to the respective partial areas 510A and 510B are used for detecting an object, any other sensor capable of detecting an object for specifying the flow line may instead be used. For example, a camera that captures movements of objects in the detection areas 51A and 51B may be used.

The DB server 400 is a database server that stores information about each article 90. For example, the DB server 400 manages various types of information about the article 90, including at least information indicating a conveyance state of the article 90 (hereinafter referred to as conveyance information) by associating it with identification information of the article 90. The conveyance information is information indicating whether or not an article has been conveyed. In this example embodiment, the conveyance information stored in the DB server 400 is updated by the information processing apparatus 300 based on the information read from the RFID tag 91 that has passed through the gate 50.

The information processing apparatus 300 is an apparatus that controls the reading apparatus 100 based on the detection results of the sensors 200A and 200B, and manages each article as to whether or not it has been conveyed based on the detection results of sensors 200A and 200B and the RSSI measured by the reading apparatus 100. The information processing apparatus 300 is connected to the reading apparatus 100, the sensors 200A and 200B, and the DB server 400 so that they can communicate with each other. Note that, in the configuration shown in FIG. 2, although the information processing apparatus 300 communicates with the DB server 400 and thereby updates the conveyance information of the article 90 managed by a database, the information processing apparatus 300 may include such a database. That is, the reading system 10 does not necessarily have to include the DB server 400.

Figure 5:
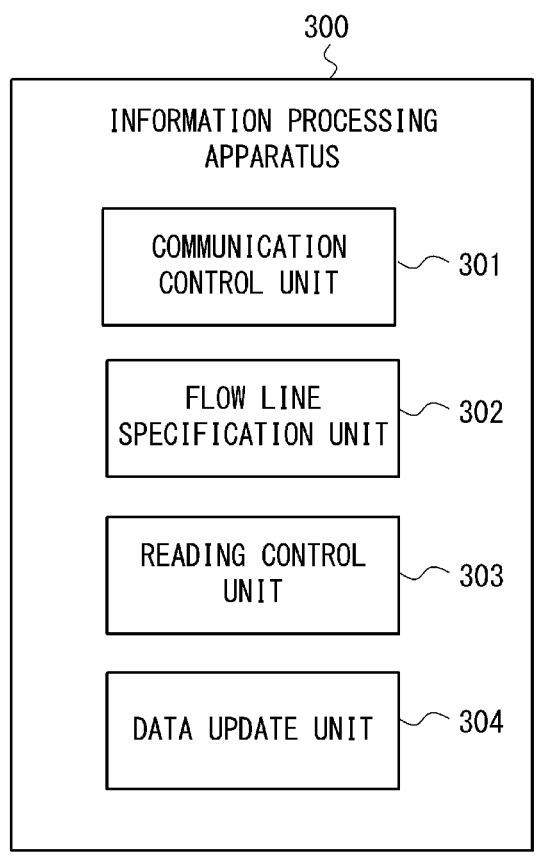
FIG. 5 is a block diagram showing an example of a functional configuration of an information processing apparatus according to an example embodiment.

FIG. 5 is a block diagram showing an example of a functional configuration of the information processing apparatus 300. As shown in FIG. 5, the information processing apparatus 300 includes a communication control unit 301, a flow line specification unit 302, a reading control unit 303, and a data update unit 304.

The communication control unit 301 communicates with another apparatus and transmits and receives information to and from the other apparatus. Specifically, the communication control unit 301 acquires information stored in the RFID tag 91 from the RFID reader 101 of the reading apparatus 100. Further, the communication control unit 301 acquires time series data of the RSSI from the RFID reader 101 of the reading apparatus 100. Therefore, the communication control unit 301 corresponds to the RSSI acquisition unit 3 shown in FIG. 1. That is, the communication control unit 301 acquires the RSSI of the signal transmitted from the RFID tag 91 located near the gate 50. Note that the communication control unit 301 may be referred to as the RSSI acquisition unit. Further, the communication control unit 301 acquires detection results from the sensors 200A and 200B. Further, the communication control unit 301 transmits and receives information about the article 90 to and from the DB server 400.

The flow line specification unit 302 corresponds to the flow line specification unit 2 shown in FIG. 1. The flow line specification unit 302 specifies, based on the detection result of the sensor 200A, a flow line of the movement of an object in the predetermined detection area 51A on the entrance side of the gate 50 and also specifies a period during which the flow line has been generated. Further, the flow line specification unit 302 specifies a flow line of the movement of an object in the predetermined detection area 51B on the exit side of the gate 50 and also specifies a period during which the flow line has been generated. In this example embodiment, the flow line specification unit 302 analyzes, by using time series data of detection results acquired from the sensors 200A and 200B, the temporal transitions of the ranges of the partial areas 510A and 510B in which the detection result indicating the presence of the object can be obtained. In this way, the flow line specification unit 302 specifies the flow line of the object and the period during which the flow line has been generated. Specifically, the flow line specification unit 302 specifies, as the flow line, the moving direction (the moving path) of the object. Note that when cameras are used as sensors for detecting an object, the flow line specification unit 302 specifies the flow line of the object and the period during which the flow line has been generated by analyzing images taken by the cameras.

The data update unit 304 updates conveyance information about the article 90 that has passed through the gate 50. Therefore, the data update unit 304 determines whether or not the article 90 specified by the identification information read from the RFID tag 91 has passed through the gate 50. The data update unit 304 determines, by using the specified flow line and the acquired RSSI, whether or not the object 90 specified by the identification information read from the RFID tag 91 has passed through the gate 50. Note that the data update unit 304 corresponds to the passage determination unit 4 in FIG. 1. Therefore, the data update unit 304 may be referred to as a passage determination unit. Details of the process of the data update unit 304 will be described later.

The reading control unit 303 determines whether or not the flow line specified by the flow line specification unit 302 corresponds to a pattern predetermined as a condition for starting reading processing of the RFID tag 91. More specifically, when the specified flow line for the movement of the object in the detection area 51A corresponds to this predetermined pattern, the reading control unit 303 performs control so that the reading processing of the RFID tag 91 near the gate 50 is started. To be specific, the reading control unit 303 instructs the reading apparatus 100 to start the reading processing of the RFID tag 91. In this way, the reading apparatus 100 starts the reading processing, and when the RFID tag 91 that can communicate with the reading apparatus 100 is present, the reading apparatus 100 reads the information of the RFID tag 91.

Specifically, in this example embodiment, the pattern predetermined as a condition for starting reading processing of the RFID tag 91 is a movement pattern of an object in which the object approaches a predetermined position near the entrance of the gate 50. That is, the reading control unit 303 performs control so that the reading processing of the RFID tag 91 is started when the specified flow line indicates a movement of an object approaching a predetermined position near the entrance of the gate 50. Note that, specifically, the predetermined position near the entrance is, for example, an edge of the detection area 51A on the gate 50 side.

Figure 6:
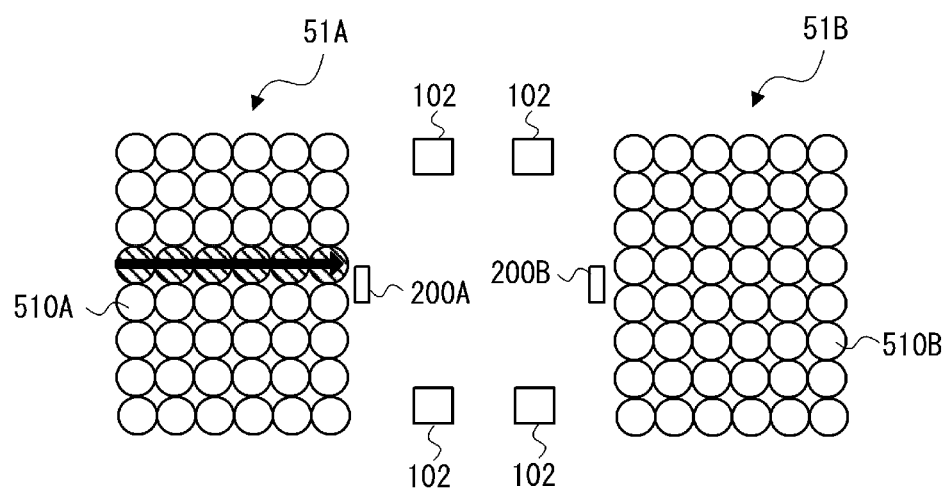
FIG. 6 is a schematic diagram showing an example of a flow line that satisfies a condition for starting an RFID tag reading process.
Figure 7:
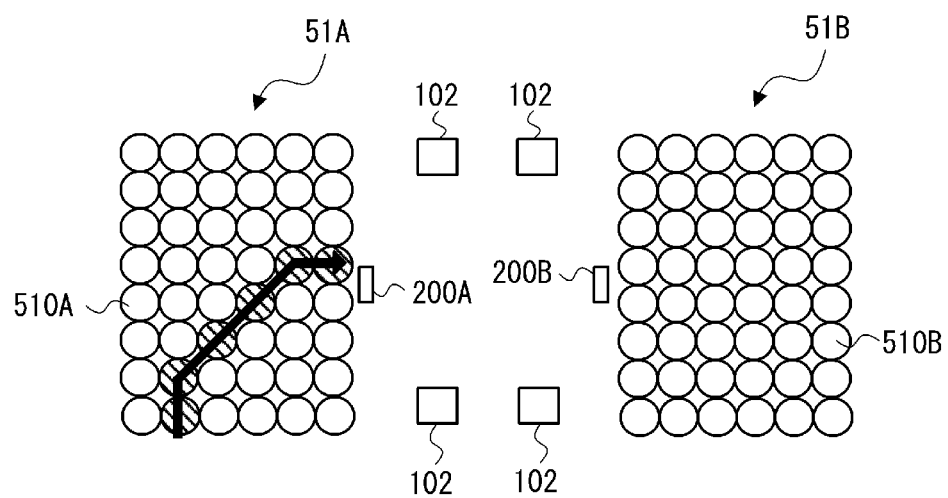
FIG. 7 is a schematic diagram showing an example of a flow line that satisfies a condition for starting RFID tag reading processing.

FIGS. 6 and 7 are schematic diagrams each showing an example of a flow line that satisfies a condition for starting reading processing of the RFID tag 91. Note that, in FIGS. 6 and 7, the hatched partial areas 510A indicate the partial areas 510A in which the presence of an object is detected, and an arrow indicates the flow line. As shown in FIGS. 6 and 7, when the specified flow line of the object indicates a movement of an object approaching a predetermined position (specifically, the edge of the detection area 51A on the gate 50 side) near the entrance of the gate 50, the reading control unit 303 performs control so that the reading processing is started.

Figure 8:
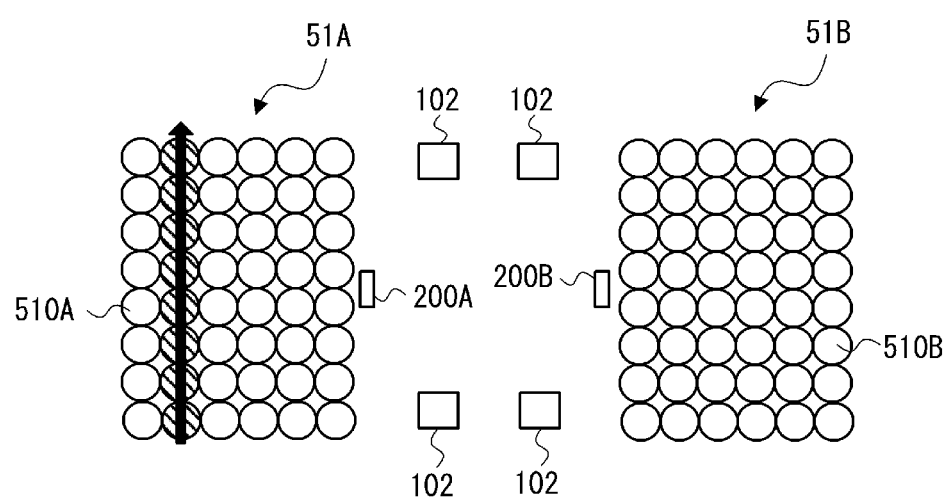
FIG. 8 is a schematic diagram showing an example of a flow line that does not satisfy a condition for starting RFID tag reading processing.
Figure 9:
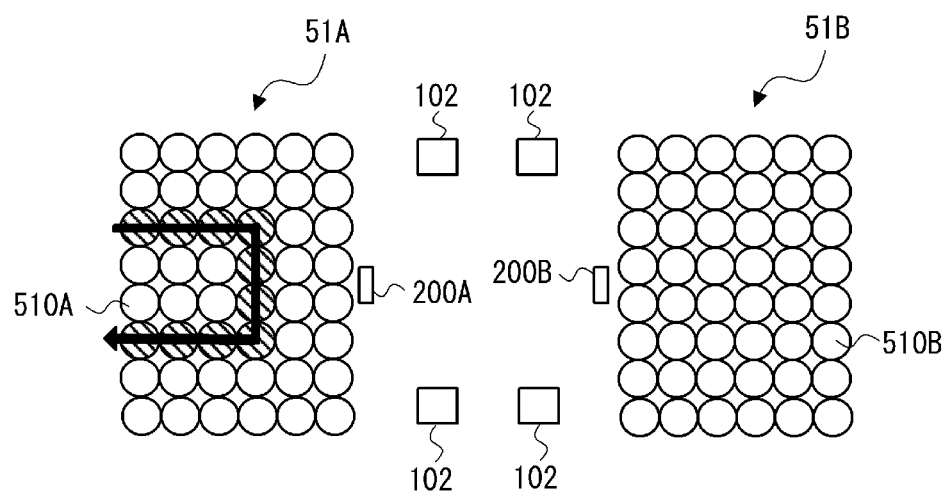
FIG. 9 is a schematic diagram showing an example of a flow line that does not satisfy a condition for starting RFID tag reading processing.

On the other hand, FIGS. 8 and 9 are schematic diagrams each showing an example of a flow line that does not satisfy the condition for starting the reading processing of the RFID tag 91. Note that, in FIGS. 8 and 9, the hatched partial areas 510A indicate the partial areas 510A in which the presence of an object is detected, and an arrow indicates the flow line. FIG. 8 shows an example of a flow line corresponding to a movement of an object crossing the periphery of the gate 50. Further, FIG. 9 shows an example of a flow line corresponding to a movement of an object turning back after once approaching the gate 50.

Further, the reading control unit 303 determines whether or not the flow line specified by the flow line specification unit 302 corresponds to a pattern that is determined in advance as a condition for ending the reading processing of the RFID tag 91. More specifically, when the specified flow line for the movement of the object in the detection area 51B corresponds to this predetermined pattern, the reading control unit 303 performs control so as to end the reading processing. Specifically, the reading control unit 303 instructs the reading apparatus 100 to end the reading processing of the RFID tag 91. As a result, the reading processing by the reading apparatus 100 is finished.

Specifically, in this example embodiment, one of patterns each of which is determined as a condition for ending the reading processing of the RFID tag 91 is a movement pattern representing a movement of an object moving away from the vicinity of the exit of the gate 50. That is, when the specified flow line indicates a movement of an object moving away from the vicinity of the exit of the gate 50, the reading control unit 303 performs control so as to end the reading processing of the RFID tag 91.

Figure 10:
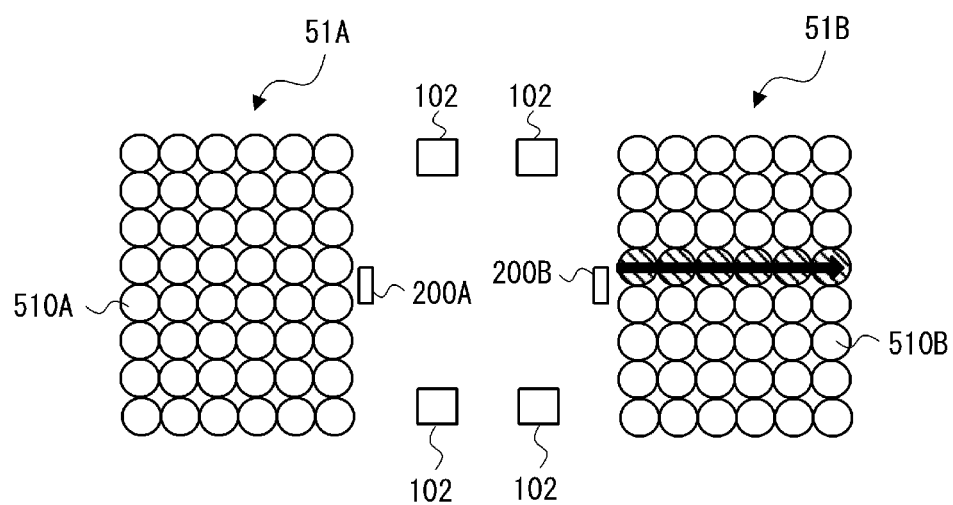
FIG. 10 is a schematic diagram showing an example of a flow line that satisfies a condition for ending RFID tag reading processing.
Figure 11:
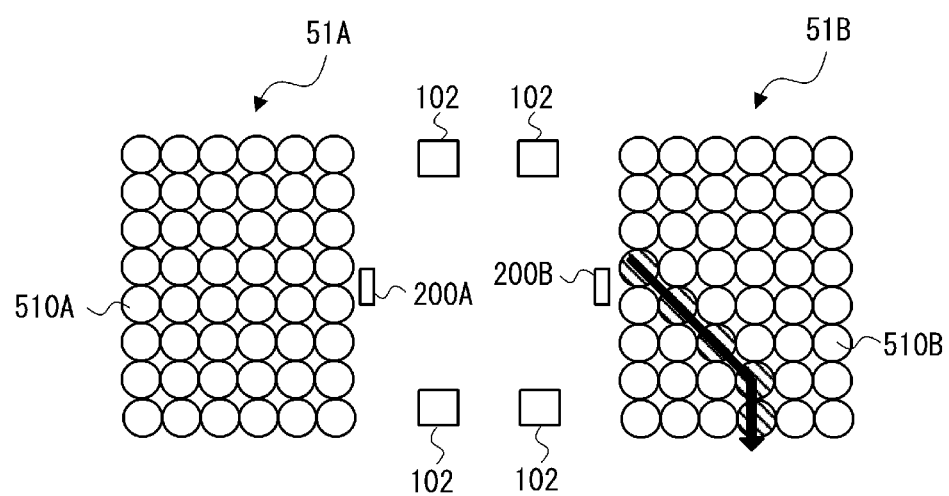
FIG. 11 is a schematic diagram showing an example of a flow line that satisfies a condition for ending RFID tag reading processing.

FIGS. 10 and 11 are schematic diagrams each showing an example of a flow line that satisfies a condition for ending the reading processing of the RFID tag 91. Note that, in FIGS. 10 and 11, the hatched partial areas 510B indicate the partial areas 510B in which the presence of an object is detected, and an arrow indicates the flow line. As shown in FIGS. 10 and 11, when the specified flow line of the object indicates a movement of an object moving away from the vicinity of the exit of the gate 50, the reading control unit 303 performs control so as to end the reading processing.

Figure 12:
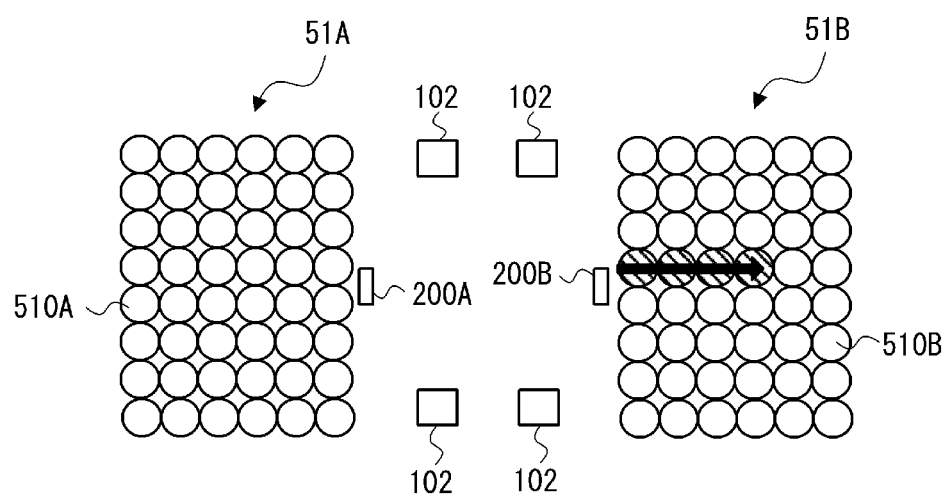
FIG. 12 is a schematic diagram showing an example of a flow line that satisfies a condition for ending RFID tag reading processing.

Note that as shown in FIGS. 10 and 11, the pattern that is determined in advance as the condition for ending the reading processing may be a movement pattern representing a movement of an object from the vicinity of the exit of the gate 50 to the outside of the detection area 51B or a movement pattern representing a movement of an object that does not move out of the detection area 51B. That is, the pattern that is determined in advance as the condition for ending the reading processing may be a movement pattern representing a movement of an object moving away from the vicinity of the exit of the gate 50 to a predetermined position in the detection area 51B (see FIG. 12). In this case, the reading processing can be terminated even when the object has not moved out of the detection area 51B, thus making it possible to prevent the reading processing from being continued in vain.

It should be noted that it is conceivable that, for example, after a flow line satisfying the condition for starting the reading processing is obtained, the person carrying the article or the like may turn back without passing through the gate 50 or after temporarily passing through the gate 50. In this case, the above-described flow line satisfying the condition for ending the reading processing is not obtained. Therefore, predetermined patterns other than the above-described pattern are also used as the condition for ending the reading processing of the RFID tag 91. Such a pattern is a movement pattern representing a movement of an object moving away from the vicinity of the entrance of the gate 50 on the entrance side of the gate 50. Therefore, when the flow line specified after the start of the reading processing indicates a movement of an object moving away from the vicinity of the entrance of the gate 50 on the entrance side of the gate 50, the reading control unit 303 performs control so as to end the reading processing. That is, when the flow line specified for the movement of the object in the detection area 51A after the start of the reading processing indicates a movement of an object moving away from the vicinity of the entrance of the gate 50, the reading control unit 303 performs control so as to end the reading processing. In such a case, the conveyance information should not be updated as information indicating that the article 90 specified by the identification information read from the RFID tag 91 has passed through the gate 50. Therefore, when the flow line specified after the start of the reading processing indicates a movement of an object moving away from the vicinity of the entrance of the gate 50 on the entrance side of the gate 50, the data update unit 304 determines that the article 90 has not passed through the gate 50. In other words, when a movement of an object moving away from the vicinity of the entrance of the gate 50 on the entrance side of the gate 50, instead of the movement of an object moving away from the vicinity of the exit of the gate 50, is detected after the start of the reading processing, the data update unit 304 determines that the article 90 has not passed through the gate 50.

Figure 13:
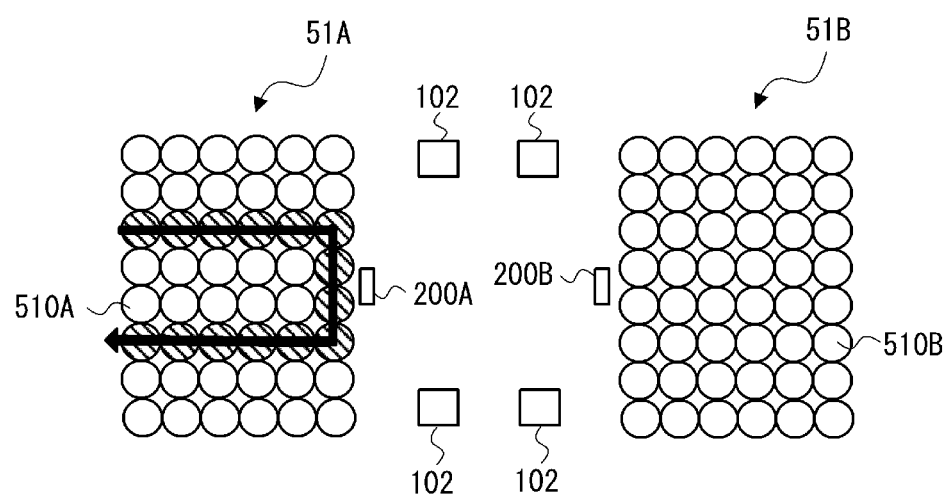
FIG. 13 is a schematic diagram showing an example of a flow line which satisfies a condition for ending RFID tag reading processing, and based on which it is determined that an article has not passed through a gate.
Figure 14:
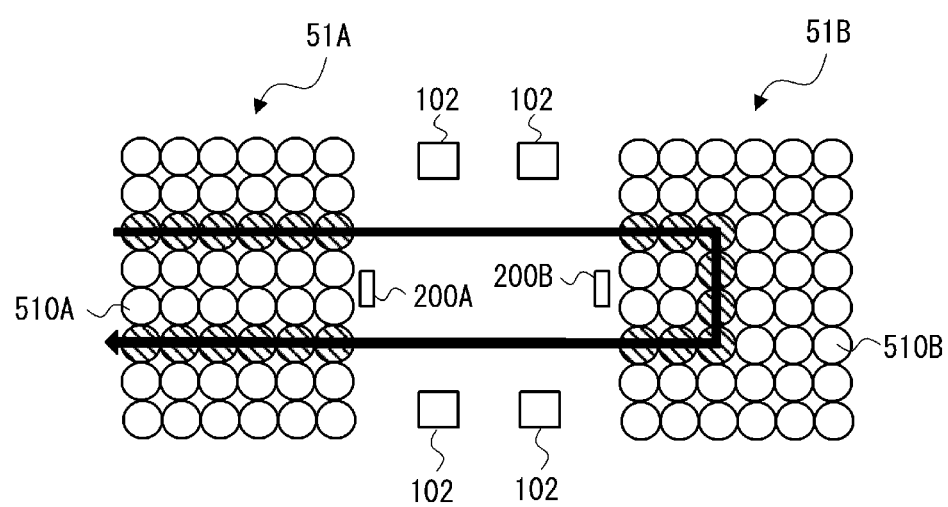
FIG. 14 is a schematic diagram showing an example of a flow line which satisfies a condition for ending RFID tag reading processing, and based on which it is determined that an article has not passed through a gate.

FIGS. 13 and 14 is schematic diagrams each showing an example of a flow line which satisfies a condition for ending reading processing, and based on which it is determined that the article 90 has not passed through the gate 50. Note that, in FIGS. 13 and 14, the hatched partial areas 510A and 510B indicate the partial areas 510A and 510B in which the presence of an object is detected, and an arrow indicates the flow line. FIG. 13 shows an example of the flow line corresponding to a movement of an object turning back without passing through the gate 50. Further, FIG. 14 shows an example of the flow line corresponding to a movement of an object that has once passed through the gate 50 but turns back. As shown in FIGS. 13 and 14, when the flow line indicates a movement of an object moving away from the vicinity of the entrance of the gate 50 on the entrance side of the gate 50 after the start of the reading processing, the reading control unit 303 performs control so as to end the reading processing. Then, the data update unit 304 determines that the article 90 specified by the read identification information has not passed through the gate 50. By the above, it is possible to prevent conveyance information from being updated to erroneous information.

Here, assume a case in which the article 90 is left near the entrance of the gate 50. Even in this case, the conveyance information should not be updated as information indicating that the article 90 specified by the identification information read from the RFID tag 91 has passed through the gate 50. Therefore, when the flow line specified after the start of the reading processing indicates that the object is staying near the entrance of the gate 50, the data update unit 304 determines that the article 90 has not passed through the gate 50. That is, when the flow line specified for the movement of the object in the detection area 51A after the start of the reading processing indicates that the object is staying near the entrance of the gate 50, the data update unit 304 determines that the article 90 has not passed through the gate 50. In other words, when it is detected that the object, instead of moving away from the vicinity of the exit of the gate 50, is staying near the entrance of the gate 50 after the start of the reading processing, the data update unit 304 determines that the article 90 has not passed through the gate 50. By the above, it is possible to prevent conveyance information from being updated to erroneous information. Further, in this case, the reading control unit 303 performs control so as to end the reading processing. That is, when the flow line specified after the start of the reading processing indicates that the object is staying near the entrance of the gate 50, the reading control unit 303 performs control so as to end the reading processing.

Note that, as described above, when the flow line specified after the start of the reading processing corresponds to one of the patterns each of which is determined as a condition for ending the reading processing, the reading control unit 303 performs control so as to end the reading processing. As described above, these predetermined patterns include, for example, a pattern representing a movement of an object moving away from the vicinity of the exit of the gate 50, a pattern representing a movement of an object moving away from the vicinity of the entrance of the gate 50 on the entrance side of the gate 50, and a pattern representing an object staying near the entrance of the gate 50.

Therefore, the data update unit 304 determines whether or not the article 90 specified by the identification information read from the RFID tag 91 has passed through the gate 50. As described above, when the reading processing is terminated because a flow line other than the flow line corresponding to the movement pattern representing a movement of an object moving away from the vicinity of the exit of the gate 50 is specified, the data update unit 304 determines that the article 90 has not passed through the gate 50. That is, the data update unit 304 determines that the article 90 specified by the identification information read by the reading processing has not passed through the gate 50. Therefore, in this case, the data update unit 304 does not update the conveyance information of this article 90 to conveyance information indicating that the article 90 has passed through the gate 50.

On the other hand, when the reading processing is terminated because a flow line corresponding to the movement pattern representing a movement of an object moving away from the vicinity of the exit of the gate 50 is specified, the data update unit 304 determines that the article 90 has passed through the gate 50. The article 90 specified by the identification information obtained in this reading processing is handled as a candidate for the article 90 that has passed through the gate 50. It should be note that, in fact, the candidate for the article 90 that has passed through the gate 50 may include an article 90 that has actually not passed through the gate 50. For example, in the case where there is another article 90 near the gate 50 (the reading apparatus 100) when the article 90 has passed through the gate 50, there is a possibility that the identification information of the RFID tag 91 of this other article 90 may also be read. Note that such unintended reading may occur due to unexpected reflection of a signal or the like even when directional antennas are used as the antennas 102.

When the reading processing is terminated because a flow line corresponding to the movement pattern representing a movement of an object moving away from the vicinity of the exit of the gate 50 is specified, that is, when it is determined that the article 90 has passed through the gate 50, the data update unit 304 specifies which article 90 has passed through the gate 50. To do so, the data update unit 304 refers to the RSSI of the signal that has been transmitted from the RFID tag 91 read by this reading processing.

It is expected that time series data of the RSSI of a signal transmitted from the RFID tag 91 of the article 90 that has actually passed through the gate 50 becomes the following time series data. The RFID tag 91 of an article 90 that actually passes through the gate 50 gradually approaches the antenna 102 provided at the gate 50 and then gradually moves away from the antenna 102. Therefore, it is expected that the time series data of the RSSI of a signal transmitted from the RFID tag 91 of the article 90 that actually passes through the gate 50 gradually increases and then gradually decreases. Therefore, the data update unit 304 determines whether or not the article 90 has actually passed through the gate 50 based on whether or not the transition of the RSSI for the article 90 of interest during the period during which the specified flow has been generated corresponds to a change pattern that is determined in advance for that flow line. Note that in this example embodiment, when any of articles 90 has passed through the gate 50, there are, as specified flow line, two flow lines. A first flow line is a flow line representing a movement of an object in the predetermined detection area 51A on the entrance side of the gate 50. More specifically, this is a flow line representing a movement approaching a predetermined position near the entrance of the gate 50, i.e., a flow line corresponding to the condition for starting the reading processing. A second flow line is a flow line representing a movement of an object in the predetermined detection area 51B on the exit side of the gate 50. More specifically, this is a flow line representing a movement of an object moving away from the vicinity of the exit of the gate 50, i.e., a flow line corresponding to the condition for ending the reading processing. Hereafter, the above-described first flow line is referred to as an IN flow line and the second flow line is referred to as an OUT flow line.

As described above, the data update unit 304 determines whether or not the article 90 has passed through the gate 50 based on whether or not the transition of the RSSI during the period during which the specified flow has been generated corresponds to a change pattern that is determined in advance for that flow line. Note that a period during which an IN flow line is generated corresponds to a period during which a movement represented by the IN flow line has occurred, and a period during which an OUT flow line is generated corresponds to a period during which a movement represented by the OUT flow line has occurred. The period during which an IN flow line is generated is a period during which the RFID tag 91 gradually approaches the antenna 102 provided at the gate 50. As a result, during this period, the value of the RSSI increases. Therefore, specifically, the change pattern that is, when the specified flow line is an IN flow, determined in advance for this specified flow line is a change pattern representing an increase in the RSSI. In contrast, the period during which an OUT flow line is generated is a period during which the RFID tag 91 gradually moves away from the antenna 102 provided at the gate 50. Therefore, during this period, the value of the RSSI decreases. Therefore, specifically, the change pattern that is, when the specified flow line is an OUT flow, determined in advance for this specified flow line is a change pattern representing a decrease in the RSSI. Therefore, the data update unit 304 determines whether or not the article 90 of interest (the RFID tag 91 of interest) has passed through the gate 50 based on whether or not the transition of the RSSI for this article 90 of interest during the period during which an IN flow line has been generated indicates an increase in the RSSI. Further, the data update unit 304 determines whether or not the article 90 of interest (the RFID tag 91 of interest) has passed through the gate 50 based on whether or not the transition of the RSSI for this article 90 of interest during the period during which an OUT flow line has been generated indicates a decrease in the RSSI.

In this example embodiment, the data update unit 304 determines that the article 90 of interest (the RFID tag 91 of interest) has passed through the gate 50 when the transition of the RSSI for this article 90 of interest satisfies both of the above-described conditions, i.e., the condition during the period during which the IN flow line has been generated and the condition during the period during which the OUT flow line has been generated. Note that it may be determined that the article 90 of interest (the RFID tag 91 of interest) has passed through the gate 50 when the transition of the RSSI for this article 90 of interest satisfies at least either of the above-described conditions, i.e., the condition during the period during which the IN flow line has been generated and the condition during the period during which the OUT flow line has been generated.

As described above, the data update unit 304 determines not only whether or not the transition of the RSSI indicates a predetermined pattern, but also whether or not the transition of the RSSI during the same period as the period during which the flow line has been generated indicates a predetermined pattern. Therefore, it is possible to specify an article 90 that has actually passed through the gate 50 more accurately than in the case where it is determined only whether or not the transition of the RSSI indicates a predetermined pattern.

When the data update unit 304 specifies the article 90 that has passed through the gate 50, it updates the conveyance information of the article 90 to conveyance information indicating that the article 90 has passed through the gate 50.

Figure 15:
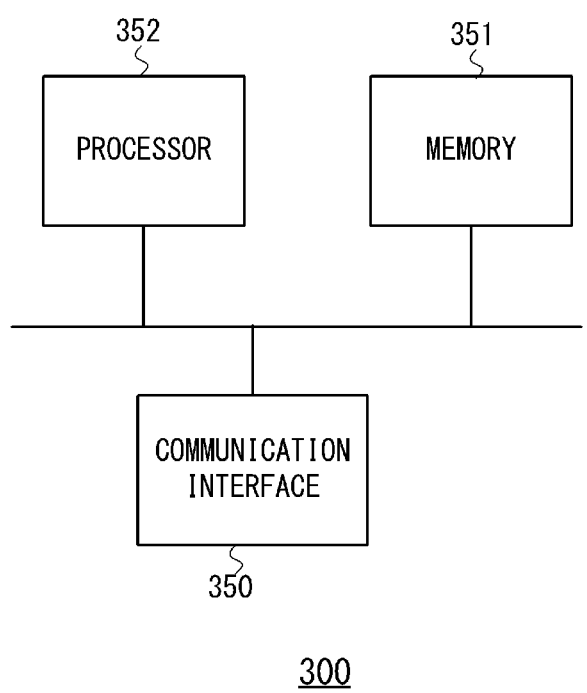
FIG. 15 is a schematic diagram showing an example of a hardware configuration of an information processing apparatus according to an example embodiment.

Next, a hardware configuration of the information processing apparatus 300 will be described. FIG. 15 is a schematic diagram showing an example of the hardware configuration of the information processing apparatus 300. As shown in FIG. 15, the information processing apparatus 300 includes a communication interface 350, a memory 351, and a processor 352.

The communication interface 350 is used to communicate with other apparatuses. In this example embodiment, the communication interface 350 includes an interface for communicating with the RFID reader 101 and an interface for communicating with the DB server 400.

The memory 351 is composed of, for example, a combination of a volatile memory and a non-volatile memory. The memory 351 is used to store software (a computer program) including at least one instruction executed by the processor 352, data used for various types of processing performed by the information processing apparatus 300, and the like.

The processor 352 loads the software (the computer program) from the memory 351 and executes the loaded software, thereby performing the processing of the communication control unit 301, the flow line specification unit 302, the reading control unit 303, and the data update unit 304 shown in FIG. 5. The processor 352 may be, for example, a microprocessor, a Micro Processor Unit (MPU), or a Central Processing Unit (CPU). The processor 352 may include a plurality of processors.

As described above, the information processing apparatus 300 has functions as a computer. Further, similarly, the DB server 400 includes a processor and a memory, and has functions as a computer. Note that, similarly, the RFID reader 101 may include a processor and a memory, and may have functions as a computer. Therefore, the function of the RFID reader 101 may be implemented by executing the program by the processor. As described above, it will be understood by those skilled in the art that the functions of the reading system 10 can be implemented in various forms by only hardware, only software, or a combination thereof, and the present disclosure is not limited to any of them.

Further, the above-described program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM (Read Only Memory), CD-R, CD-R/W, and semiconductor memories (such as mask ROM, Programmable ROM (PROM), Erasable PROM (EPROM), flash ROM, Random Access Memory (RAM), etc.). Further, the program be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 16:
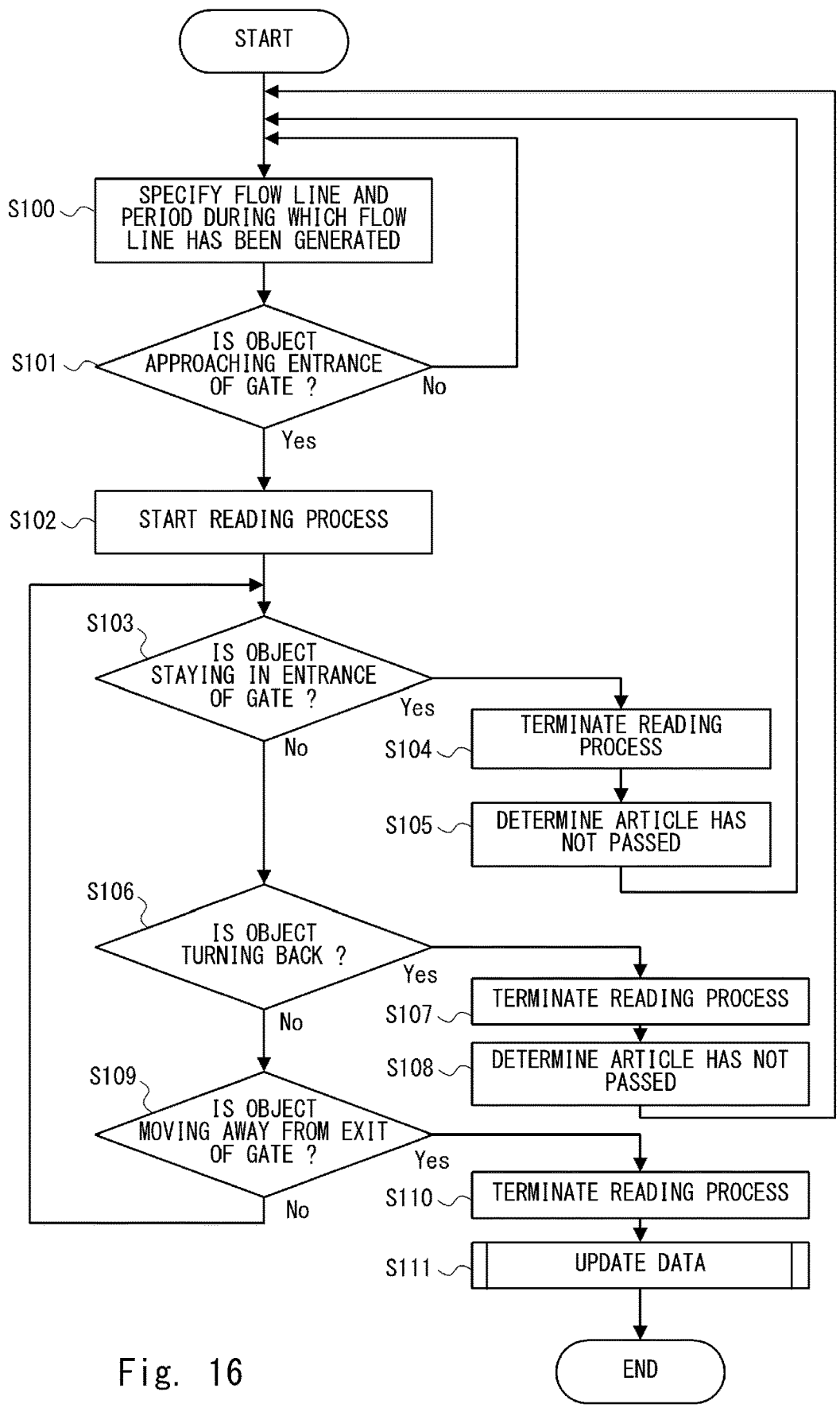
FIG. 16 is a flowchart showing an example of an operation flow of a reading system according to an example embodiment.

Next, operations of the reading system 10 will be described. FIG. 16 is a flowchart showing an example of a flow of the operations performed by the reading system 10 according to the first example embodiment. The flow of the operations performed by the reading system 10 will be described below with reference to FIG. 16.

In a step S100, the flow line specification unit 302 specifies a flow line of the movement of an object and a time at which the object has moved (a period during which the flow line has been generated) based on results of detection by the sensors 200A and 200B. Note that this process performed by the flow line specification unit 302 is continuously performed even during the process in the step S101 and the subsequent processes.

Next, in the step S101, the reading control unit 303 determines whether or not the flow line specified by the flow line specification unit 302 corresponds to a pattern predetermined as a condition for starting reading processing of the RFID tag 91. That is, the reading control unit 303 determines whether or not the specified flow line indicates a movement of an object approaching the entrance of the gate 50. If the specified flow line does not indicate the movement of an object approaching the entrance of the gate 50, the reading processing is not started and the process returns to the step S100. On the other hand, if the specified flow line indicates the movement of an object approaching the entrance of the gate 50, the process proceeds to the step S102.

In a step S102, the reading control unit 303 determines that the condition for starting the reading processing has been satisfied and hence performs control so as to start the reading processing of the RFID tag 91.

Next, in a step S103, the data update unit 304 determines whether or not the flow line after the start of the reading processing indicates that the object is staying near the entrance of the gate 50. When the object is staying in the entrance of the gate 50 for a predetermined time or longer, the process proceeds to a step S104, whereas this is not the case, the process proceeds to a step S106.

In the step S104, the reading control unit 303 performs control so as to end the reading processing.

Then, in a step S105, the data update unit 304 determines that the article 90 specified by the identification information read from the RFID tag 91 by the reading processing started in the step S102 has not passed through the gate 50. After the step S105, the process returns to the step S100.

On the other hand, in the step S106, the data update unit 304 determines whether or not the flow line specified after the start of the reading processing indicates a movement of an object turning back from the vicinity of the entrance of the gate 50. When the flow line indicates a movement of an object turning back from of the vicinity of the entrance of the gate 50, the process proceeds to a step S107, whereas when this is not the case, the process proceeds to a step S109.

In the step S107, the reading control unit 303 performs control so as to end the reading processing.

Then, in a step S108, the data update unit 304 determines that the article 90 specified by the identification information read from the RFID tag 91 by the reading processing started in the step S102 has not passed through the gate 50. After the step S108, the process returns to the step S100.

On the other hand, in the step S109, the data update unit 304 determines whether the flow line specified after the start of the reading processing indicates a movement of an object moving away from the vicinity of the exit of the gate 50. When the flow line indicates a movement of an object moving away from the vicinity of the exit of the gate 50, the process proceeds to a step S110, whereas when this is not the case, the process returns to the step S103.

In the step S110, the reading control unit 303 performs control so as to end the reading processing.

Then, in a step S111, the data update unit 304 updates the conveyance information of the article 90, which has passed through the gate 50, to conveyance information indicating that the article 90 has passed through the gate 50. The flow of the process in this step will be described in detail with reference to FIG. 17.

Figure 17:
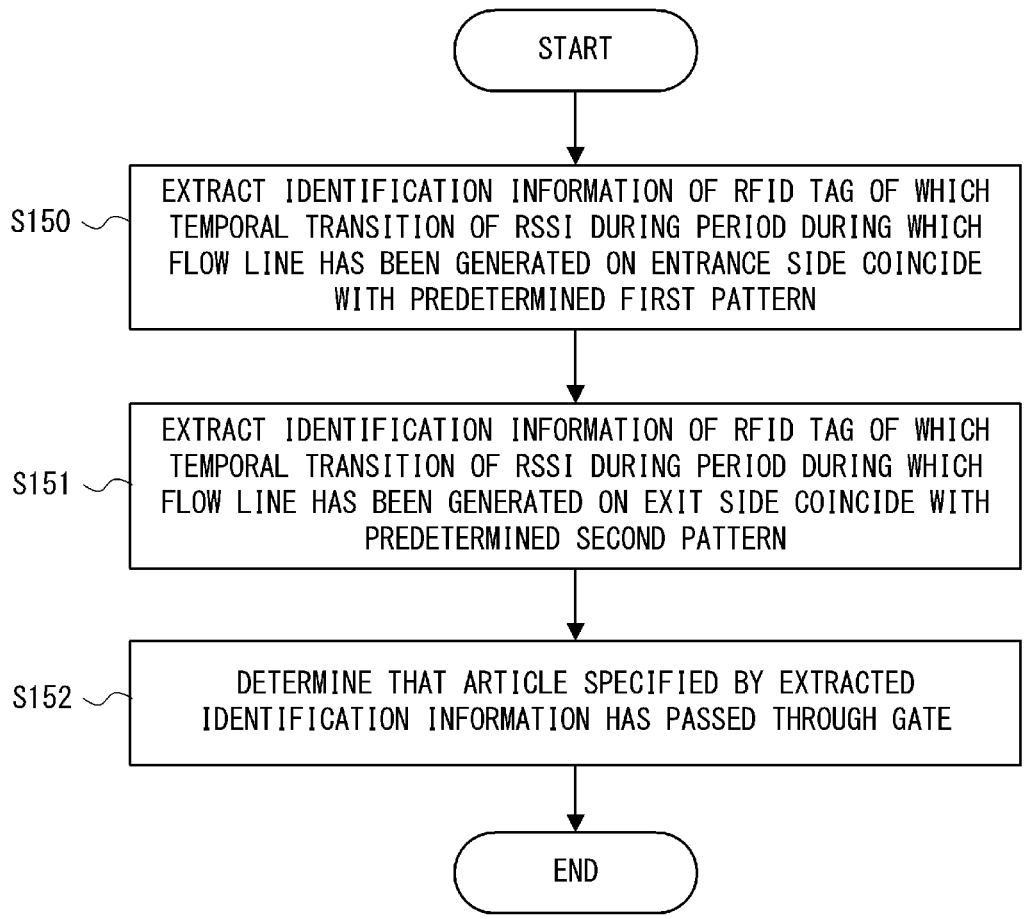
FIG. 17 is a flowchart showing an example of a specific process flow in a step S111 shown in FIG. 16.

FIG. 17 is a flowchart showing an example of a specific process flow in the step S111 shown in FIG. 16. In this process, the data update unit 304 determines, for each of RFID tags 91 read by the reading processing started in the step S102, whether or not its RSSI indicates a specific pattern in a specific period. In this way, the data update unit 304 specifies the RFID tag 91 (the article 90) that has passed through the gate 50. The process flow will be described hereinafter with reference to FIG. 17.

Firstly, in a step S150, the data update unit 304 extracts the identification information of, among the read RFID tags 91, an RFID tag 91 of which the transition of the RSSI during the period during which the flow line has been generated on the entrance side coincides with a predetermined first pattern. That is, the data update unit 304 extracts an RFID tag 91 of which the transition of the RSSI during the period during which the flow line specified in the step S101 has been generated coincides with a change pattern representing an increase in the RSSI.

Next, in a step S151, the data update unit 304 extracts the identification information of, among the RFID tags 91 extracted in the step S150, an RFID tag 91 of which the transition of the RSSI during the period during which the flow line has been generated on the exit side coincides with a predetermined second pattern. That is, the data update unit 304 extracts an RFID tag 91 of which the transition of the RSSI during the period during which the flow line specified in the step S109 has been generated coincides with a change pattern representing a decrease in the RSSI.

Then, in a step S152, the data update unit 304 determines that the article 90 specified by the identification information extracted in the step S151 has passed through the gate 50. Then, the data update unit 304 updates the conveyance information of this article 90 to a value indicating that the conveyance has already been carried out.

The first example embodiment has been described above. According to the reading system 10, the determination of passage through the gate is made by using two types of information items, i.e., the RSSI of a signal transmitted from the RFID tag and the flow line of a movement that has occurred in an area near the gate. Therefore, it is possible to manage (i.e., determine) the carrying-in or carrying-out of articles more reliably. In particular, in this example embodiment, it is determined not only whether or not the transition of the RSSI indicates a predetermined pattern, but also whether or not the transition of the RSSI during the same period as the period during which the flow line has been generated indicates a predetermined pattern. Therefore, it is possible to specify an article 90 that has actually passed through the gate 50 more accurately.

SECOND EXAMPLE EMBODIMENT

Next, a second example embodiment will be described. This example embodiment differs from the first example embodiment in that conveyance information is appropriately updated even in an environment in which a plurality of gates 50 are installed in a row.

Figure 18:
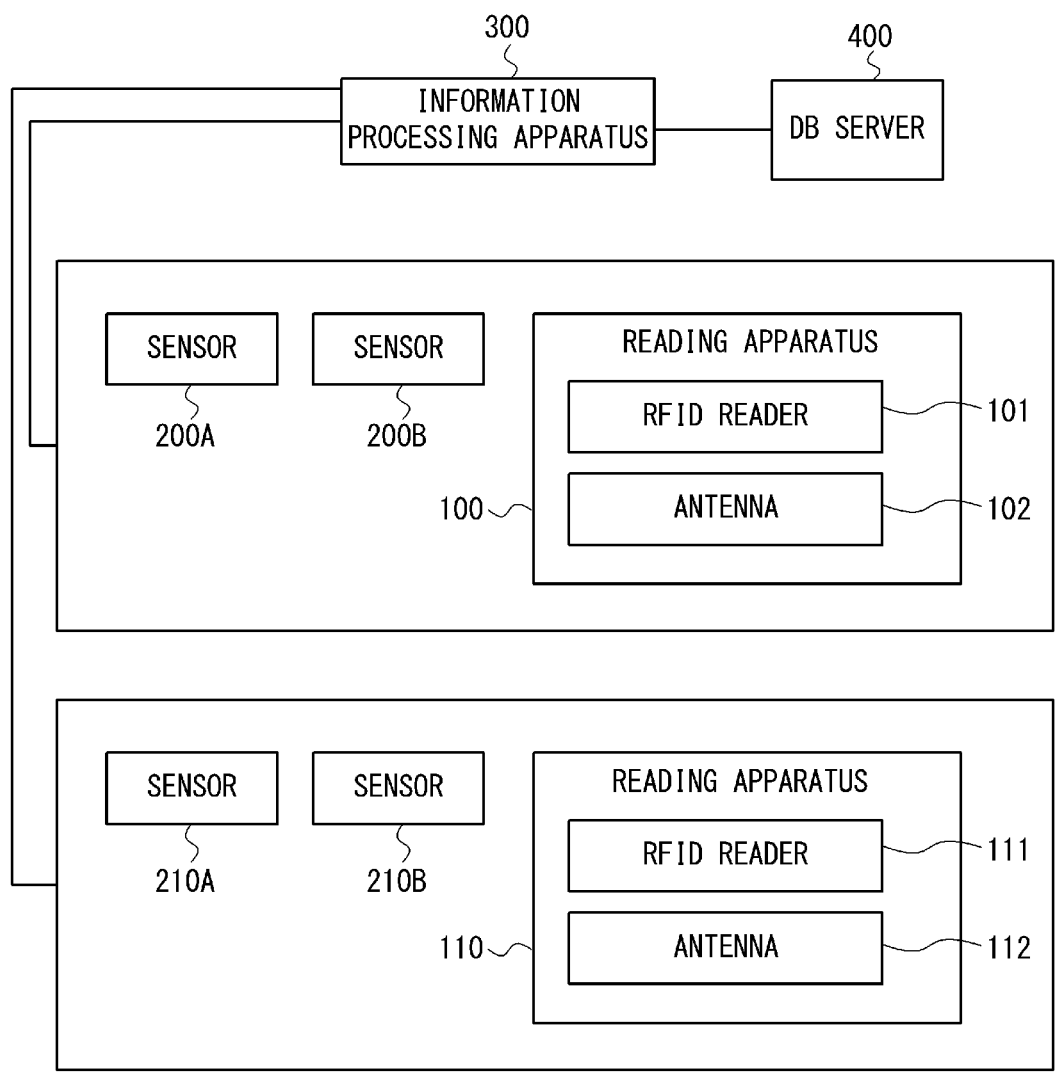
FIG. 18 is a block diagram showing an example of a configuration of a reading system according to a second example embodiment.
Figure 19:
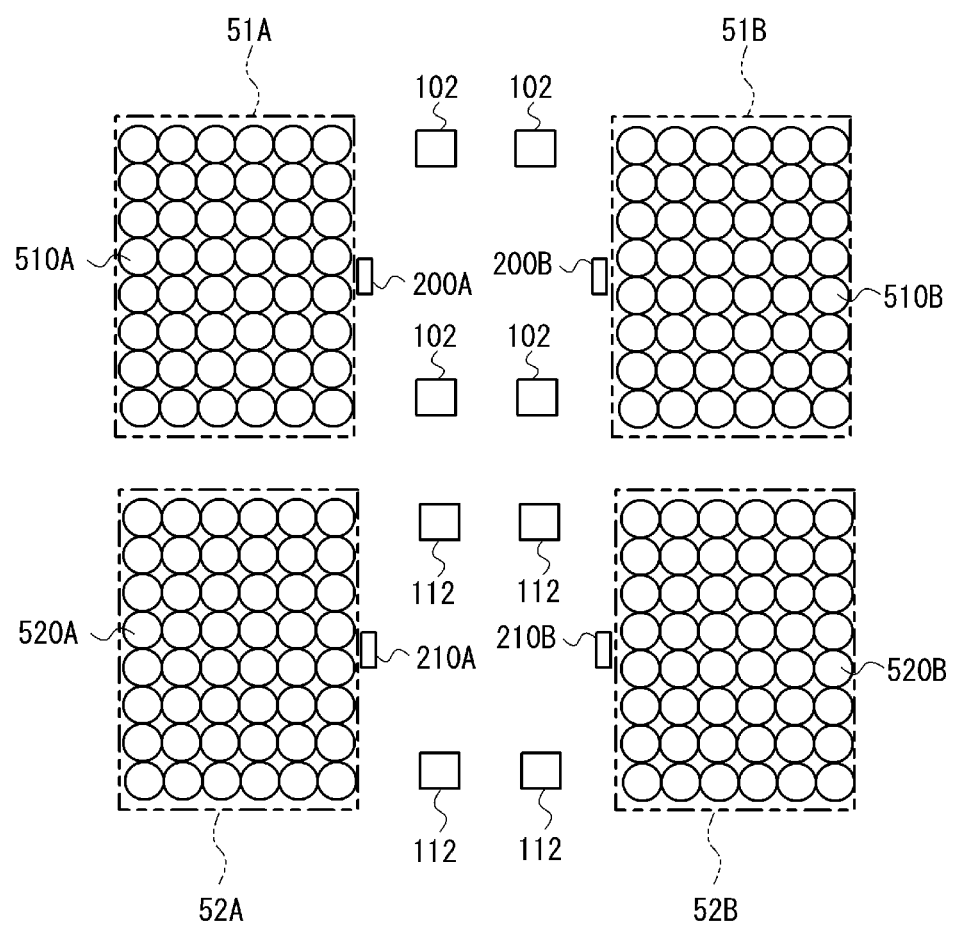
FIG. 19 is a schematic diagram showing gates and a configuration in an area around the gates according to the second example embodiment viewed from above.

FIG. 18 is a block diagram showing an example of a configuration of a reading system 20 according to the second example embodiment. Further, FIG. 19 is a schematic diagram showing gates and a configuration in an area around the gates according to the second example embodiment viewed from above. In this example embodiment, the reading system 20 manages (i.e., determines) which article 90 has passed through which gate 50 in an environment in which there are two gates 50. Note that although the number of gates 50 is two in this example, the number of gates may be three or more.

As shown in FIG. 18, the reading system 20 differs from the reading system 10 shown in FIG. 2 because it also includes a reading apparatus 110, and sensors 210A and 210B. The reading apparatus 110 includes an RFID reader 111 and an antenna 112. The configurations of the reading apparatus 110, and the sensors 210A and 210B are similar to those of the reading apparatus 100, and the sensors 200A and 200B described in the first example embodiment, and they perform processes similar to those performed in the first example embodiment. Therefore, detailed descriptions of them are omitted. However, the reading apparatus 100, and the sensors 200A and 200B are equipment for a first gate 50, and the reading apparatus 110, and the sensors 210A and 210B are equipment for a second gate 50. Note that as shown in FIG. 19, the sensor 210A is a sensor for detecting an object in a predetermined detection area 52A (also referred to as a first area) on the entrance side of the second gate 50. Further, the sensor 210B is a sensor for detecting an object in a predetermined detection area 52B (also referred to as a second region) on the exit side of the second gate 50. Each of the sensors 210A and 210B emits a light beam to each of partial areas 520A and each of partial areas 520B, respectively, which are obtained by dividing the predetermined detection areas 52A and 52B, respectively, and receives reflected light of the light beam. By doing so, each of the sensors 210A and 210B detects an object.

If reading processing is performed at a plurality of gates 50 at the same or close timings, there is a case where the RFID tag 91 of an article 90 that has passed through the first gate 50 is read not only by the reading apparatus 100 for this first gate 50 but also by the reading apparatus 110 for the second gate 50. Similarly, there is a case where the RFID tag 91 of an article 90 that has passed through the second gate 50 may be read not only by the reading apparatus 110 for this second gate 50 but also by the reading apparatus 100 for the first gate 50. For such situations, two typical cases will be described in detail.

Firstly, a first case is a case where although a timing at which a first article 90 passes through the first gate 50 and a timing at which a second article 90 passes through the second gate 50 differ from each other, the execution periods of the reading processing for reading these passages partially overlap each other. That is, although there is a difference between the execution periods of the reading processing performed by the reading apparatus 100 and that performed by the reading apparatus 110, these execution periods partially overlap each other. In other words, it is a case where although there is a difference between the period during which a flow line for the first gate 50 has been generated and the period during which a flow line for the second gate 50 has been generated, these periods partially overlap each other. In such a case, it is possible to specify the gate 50 through which the article has passed by performing the processing described in the first example embodiment, i.e., by performing the processing for determining whether the transition of the RSSI in the same period as the period during which the flow line has been generated indicates a predetermined pattern. The reason for this is as follows. In this case, the transition of the RSSI of the RFID tag 91 of the first article 90 during the period during which the flow line for the first gate has been generated indicates a predetermined pattern. However, the transition of the RSSI of the RFID tag 91 of the second article 90 during the period during which the flow line for the first gate has been generated does not indicate the predetermined pattern. Therefore, while it is determined that the first article 90 has passed through the first gate 50, it is not determined that the second article 90 has passed through the first gate 50. Similarly, in this case, the transition of the RSSI of the RFID tag 91 of the second article 90 during the period during which the flow line for the second gate has been generated indicates a predetermined pattern. However, the transition of the RSSI of the RFID tag 91 of the first article 90 during the period during which the flow line for the second gate has been generated does not indicate the predetermined pattern. Therefore, while it is determined that the second article 90 has passed through the second gate 50, it is not determined that the first article 90 has passed through the second gate 50.

A second case is a case where a timing at which a first article 90 passes through the first gate 50 and a timing at which a second article 90 passes through the second gate 50 coincide with each other, and the execution periods of the reading processing for reading these passages completely overlap each other (i.e., completely coincide with each other). That is, it is a case where the execution periods of the reading processing performed by the reading apparatus 100 and that performed by the reading apparatus 110 completely overlap each other. In other words, it is a case where the period during which a flow line for the first gate 50 has been generated and the period during which a flow line for the second gate 50 has been generated completely overlap each other. In such a case, during the period during which the flow line for the first gate has been generated, not only the transition of the RSSI of the RFID tag 91 of the first article 90 but also the transition of the RSSI of the RFID tag 91 of the second article 90 may indicate the predetermined pattern. Similarly, during the period during which the flow line for the second gate has been generated, not only the transition of the RSSI of the RFID tag 91 of the second article 90 but also the transition of the RSSI of the RFID tag 91 of the first article 90 may indicate the predetermined pattern. Therefore, in this example embodiment, in order to specify which article 90 has passed through which gate 50 even in such a case, the data update unit 304 performs the following process. That is, the data update unit 304 according to this example embodiment specifies which gate 50 the article 90 has passed through based on the magnitude of the RSSI of a signal transmitted from the same RFID tag 91 measured at each of the gates 50. Details of the processing of the data update unit 304 in this example embodiment will be described later with reference to a flowchart.

Note that in this example embodiment, the communication control unit 301 separately acquires information from the RFID reader 101 of the reading apparatus 100 and information from the RFID reader 111 of the reading apparatus 110. Specifically, the information from the RFID reader 101 (the RFID reader 111) is information stored in the RFID tag 91 and time series data of the RSSI. That is, the communication control unit 301 acquires the RSSI of each of signals received at the plurality of gates 50, respectively, while distinguishing (i.e., specifying) which of the gates 50 the signals with measured the RSSIs have been received at. Further, the communication control unit 301 acquires information from the sensors 200A, 200B, 210A, and 210B while distinguishing (i.e., specifying) which of the gates 50 the sensors, from which the information is received, correspond to. Therefore, in this example embodiment, the information processing apparatus 300 can distinguish (i.e., specify) which of the gates 50 the time series data of the RSSIs correspond to. Similarly, the information processing apparatus 300 can distinguish (i.e., specify) which of the gates 50 the flow lines specified by the flow line specification unit 302 correspond to.

Figure 20:
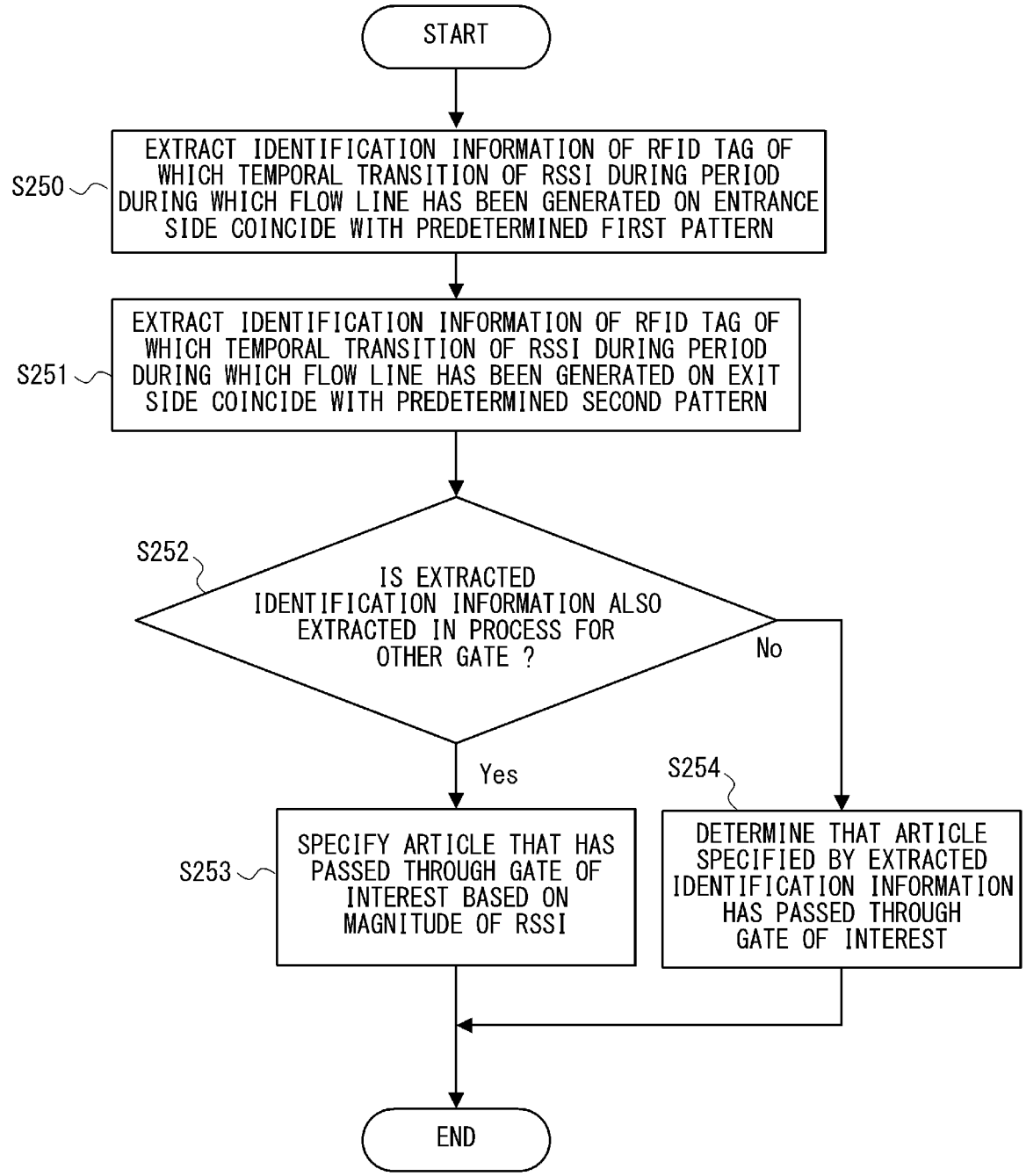
FIG. 20 is a flowchart showing an example of a specific process flow of a step S111 shown in FIG. 16.

In this example embodiment, processes shown in FIG. 20, instead of the processes shown in FIG. 17, are performed as the processes in the step S111 shown in FIG. 16. Note that in this example embodiment, a series of processes shown in FIGS. 16 and 20 is performed for each of the gates 50, and these series of processes for the plurality of gates 50 are performed in parallel. Details of the process of the data update unit 304 in this example embodiment will be described hereinafter with reference to FIG. 20. Note that in the following description, the process for the first gate 50 will be described as an example.

Firstly, in a step S250, the data update unit 304 extracts the identification information of, among the read RFID tags 91 read by the reading apparatus 100, an RFID tag 91 of which the transition of the RSSI during the period during which the flow line has been generated on the entrance side (in the detection area 51A) coincides with a predetermined first pattern. That is, the data update unit 304 extracts an RFID tag 91 of which the transition of the RSSI during the period during which the flow line specified in the step S101 has been generated coincides with a change pattern representing an increase in the RSSI.

Next, in a step S251, the data update unit 304 extracts the identification information of, among the RFID tags 91 extracted in the step S250, the RFID tag 91 of which the transition of the RSSI during the period during which the flow line has been generated on the exit side (in the detection area 51B) coincides with a predetermined second pattern. That is, the data update unit 304 extracts an RFID tag 91 of which the transition of the RSSI during the period during which the flow line specified in the step S109 has been generated coincides with a change pattern representing a decrease in the RSSI.

Next, in a step S252, the data update unit 304 determines whether or not the identification information extracted in the step S251 has also been extracted in the process for the other gate 50. That is, the data update unit 304 determines whether or not the identification information extracted in the step S251 in the process for the first gate 50 has also been extracted in the process for the second gate 50. When the identification information extracted in the step S251 has also been extracted in the process for the other gate 50, the process proceeds to a step S253, whereas when this is not the case, the process proceeds to a step S254. In the above-described second case, the identification information of the RFID tag 91 of the first article, which has passed through the first gate 50, and the identification information of the RFID tag 91 of the second article, which has passed through the second gate 50, are extracted in both the process for the first gate 50 and the process for the second gate 50. Therefore, in the above-described second case, the process proceeds to the step S253.

In the step S253, the data update unit 304 specifies which gate 50 the article 90 has passed through based on the magnitude of the RSSI of the signal transmitted from the same RFID tag 91 measured at each of the gates 50. When the identification information extracted in the process for the gate 50 of interest (i.e., the first gate 50 in this process) has also been extracted in the process for the other gates 50, the data update unit 304 specifies the article 90 that has passed through the gate 50 of interest, for example, as follows. The data update unit 304 compares the RSSI of the signal transmitted from the RFID tag 91 having this identification information, measured by the reading apparatus of the gate 50 of interest with the RSSI of the signal transmitted from the RFID tag 91 having this identification information, measured by the reading apparatus of the other gate 50. Then, when the RSSI measured by the reading apparatus of the gate 50 of interest is the largest, the data update unit 304 determines that the article 90 corresponding to the RFID tag 91 having this identification information has passed through the gate 50 of interest (the first gate 50). For example, assume that the first article 90 has passed through the first gate 50. In this case, the distance between the RFID tag 91 of the first article 90 and the reading apparatus 100 of the first gate 50 is shorter than the distance between the RFID tag 91 of the first article 90 and the reading apparatus 110 of the second gate 50. Therefore, the RSSI of the signal transmitted from the RFID tag 91 of the first article 90, measured by the reading apparatus 100 is larger than that measured by the reading apparatus 110. Therefore, by the above-described determination, it is possible to appropriately determine which article 90 has passed through which gate 50.

Note that the data update unit 304 may specify the object that has passed through the gate 50 of interest as follows. The data update unit 304 may determine that the object 90 corresponding to, among the RFID tags 91 extracted in the step S251, an RFID tag 91 having the largest RSSI measured by the reading apparatus of the gate 50 of interest (the first gate 50) has passed through the gate 50 of interest.

When the data update unit 304 specifies the object 90 that has passed through the gate 50 of interest, it updates the conveyance information of the object 90 to a value indicating that the conveyance of the article 90 through the gate 50 of interest has already been carried out.

In contrast, in the step S254, the data update unit 304 determines that the object 90 specified by the identification information extracted in the step S251 has passed through the gate 50 of interest. Then, the data update unit 304 updates the conveyance information of the object 90 to a value indicating that the conveyance of the article 90 through the gate 50 of interest has already been carried out.

The second example embodiment has been described above. According to the reading system 20, it is possible to determine which article 90 has passed (or has not passed) through which gate 50 by comparing the magnitudes of RSSIs. Therefore, it is possible to appropriately manage the conveyance of articles 90 even when a plurality of gates 50 are installed.

Although the present invention has been described with reference to the example embodiments, the present invention is not limited to the above-described example embodiments. Various changes that may be understood by those skilled in the art may be made to the configurations and details of the present invention within the scope of the invention.

This application is based upon and claims the benefit of priority from Japanese patent application No. 2020-191088, filed on Nov. 17, 2020, the disclosure of which is incorporated herein in its entirety by reference.

REFERENCE SIGNS LIST

1 INFORMATION PROCESSING APPARATUS
2 FLOW LINE SPECIFICATION UNIT
3 RSSI ACQUISITION UNIT
4 PASSAGE DETERMINATION UNIT
10 READING SYSTEM
20 READING SYSTEM
50 GATE
51A DETECTION AREA
51B DETECTION AREA
52A DETECTION AREA
52B DETECTION AREA
90 ARTICLE
91 RFID TAG
100 READING APPARATUS
101 RFID READER
102 ANTENNA
110 READING APPARATUS
111 RFID READER
112 ANTENNA
200A SENSOR
200B SENSOR
201 LIGHT BEAM
210A SENSOR
210B SENSOR
300 INFORMATION PROCESSING APPARATUS
301 COMMUNICATION CONTROL UNIT
302 FLOW LINE SPECIFICATION UNIT
303 READING CONTROL UNIT
304 DATA UPDATE UNIT
350 COMMUNICATION INTERFACE
351 MEMORY
352 PROCESSOR
400 DB SERVER
510A PARTIAL AREA
510B PARTIAL AREA
520A PARTIAL AREA
520B PARTIAL AREA

What is claimed is:

1. An information processing apparatus comprising:
at least one memory storing instructions; and
at least one processor configured to execute the instructions stored in the memory to:
specify a first flow line of a first movement of an object in a predetermined first area outside a gate and on an entrance side of the gate, the first area comprising a plurality of first partial areas, the first flow line being specified by specifying two or more partial areas on which the object has moved among the plurality of first partial areas;
specify a second flow line of a second movement of the object in a predetermined second area outside the gate and on an exit side of the gate, the second area comprising a plurality of second partial areas, the second flow line being specified by specifying two or more partial areas on which the object has moved among the plurality of second partial areas;
specify a first period during which the specified first flow line in the first area has been generated and a second period during which the specified second flow line in the second area has been generated, respectively;
acquire a Received Signal Strength Indicator (RSSI) of a signal transmitted from a radio frequency identifier (RFID) tag located outside the gate; and
determine that an article specified by identification information read from the RFID tag has passed through the gate in a case where a transition of the RSSI during the specified first period during which the specified first flow line in the first area has been generated indicates an increase in the RSSI and a transition of the RSSI during the specified second period during which the specified second flow line in the second area has been generated indicates a decrease in the RSSI.

2. The information processing apparatus according to claim 1, wherein the processor is further configured to execute the instructions to:
acquire an RSSI of each of a plurality of signals received at a plurality of the gates, respectively; and
specify which of the gates the article has passed through based on a magnitude of an RSSI of a signal transmitted from the same RFID tag measured at each of the gates.

3. An information processing method comprising:
specifying a first flow line of a first movement of an object in a predetermined first area outside a gate and on an entrance side of the gate, the first area comprising a plurality of first partial areas, the first flow line being specified by specifying two or more partial areas on which the object has moved among the plurality of first partial areas;
specifying a second flow line of a second movement of the object in a predetermined second area outside the gate and on an exit side of the gate, the second area comprising a plurality of second partial areas, the second flow line being specified by specifying two or more partial areas on which the object has moved among the plurality of second partial areas;
specifying a first period during which the specified first flow line in the first area has been generated and a second period during which the specified second flow line in the second area has been generated, respectively;
acquiring a Received Signal Strength Indicator (RSSI) of a signal transmitted from a radio frequency identifier (RFID) tag located outside the gate; and
determining that an article specified by identification information read from the RFID tag has passed through the gate in a case where a transition of the RSSI during the specified first period during which the specified first flow line in the first area has been generated indicates an increase in the RSSI and a transition of the RSSI during the specified second period during which the specified second flow line in the second area has been generated indicates a decrease in the RSSI.

4. A non-transitory computer readable medium storing a program for causing a computer to perform:
a first flow line specification operation comprising specifying a first flow line of a first movement of an object in a predetermined first area outside a gate and on an entrance side of the gate, the first area comprising a plurality of first partial areas, the first flow line being specified by specifying two or more partial areas on which the object has moved among the plurality of first partial areas;
a second flow line specification operation comprising specifying a second flow line of a second movement of the object in a predetermined second area outside the gate and on an exit side of the gate, the second area comprising a plurality of second partial areas, the second flow line being specified by specifying two or more partial areas on which the object has moved among the plurality of second partial areas;
a period specification operation comprising specifying a first period during which the specified first flow line in the first area has been generated and a second period during which the specified second flow line in the second area has been generated, respectively;
a Received Signal Strength Indicator (RSSI) RSSI acquisition operation comprising acquiring an RSSI of a signal transmitted from a radio frequency identifier (RFID) tag located outside the gate; and
a passage determination operation comprising determining that an article specified by identification information read from the RFID tag has passed through the gate in a case where a transition of the RSSI during the specified first period during which the specified first flow line in the first area has been generated indicates an increase in the RSSI and a transition of the RSSI during the specified second period during which the specified second flow line in the second area has been generated indicates a decrease in the RSSI.

* * * * *